A. G. HERRESHOFF AND A. H. LEIPERT.
UNIVERSAL JOINT.
APPLICATION FILED DEC. 23, 1919.

1,414,411.

Patented May 2, 1922.

INVENTOR
Alexander G. Herreshoff
August H. Leipert
BY
Redding Greeley
ATTORNEYS

UNITED STATES PATENT OFFICE.

ALEXANDER GRISWOLD HERRESHOFF AND AUGUST H. LEIPERT, OF NEW YORK, N. Y.

UNIVERSAL JOINT.

1,414,411.  Specification of Letters Patent.  Patented May 2, 1922.

Application filed December 23, 1919. Serial No. 346,916.

*To all whom it may concern:*

Be it known that we, ALEXANDER G. HERRESHOFF and AUGUST H. LEIPERT, citizens of the United States, residing, respectively, in the borough of Manhattan of the city of New York, and in the borough of Queens of the city of New York, in the State of New York, have jointly invented certain new and useful Improvements in Universal Joints, of which the following is a specification, reference being had to the accompanying drawing, forming a part hereof.

This invention relates to an improved universal joint in which the driving torque is applied from the driving member to the driven member along straight force lines which are co-incident with the axes of the transmitting elements rather than angularly thereto as is the common practise. In universal joints of known types, the transmitting elements between the driving and driven members have imposed thereon diverging stresses which lessen the efficiency of transmission and impose objectionable shearing stresses thereon. The principal object of the present invention is to provide a universal joint which is of simple and inexpensive construction, easy to assemble, flexible in character so as to accommodate itself readily to varying degrees of angularity between the driving and the driven members and in which the driving torque is transmitted by elements which extend along straight lines co-incident with the lines of force of the driving torque. A further object of the invention is to provide in a joint of the character described improved spacing means whereby the driving and driven members are maintained in proper spaced relationship and are permitted free angular movement with relation to such spacing device. The invention will be described with greater particularity in connection with the accompanying drawing in which—

Figure 1:
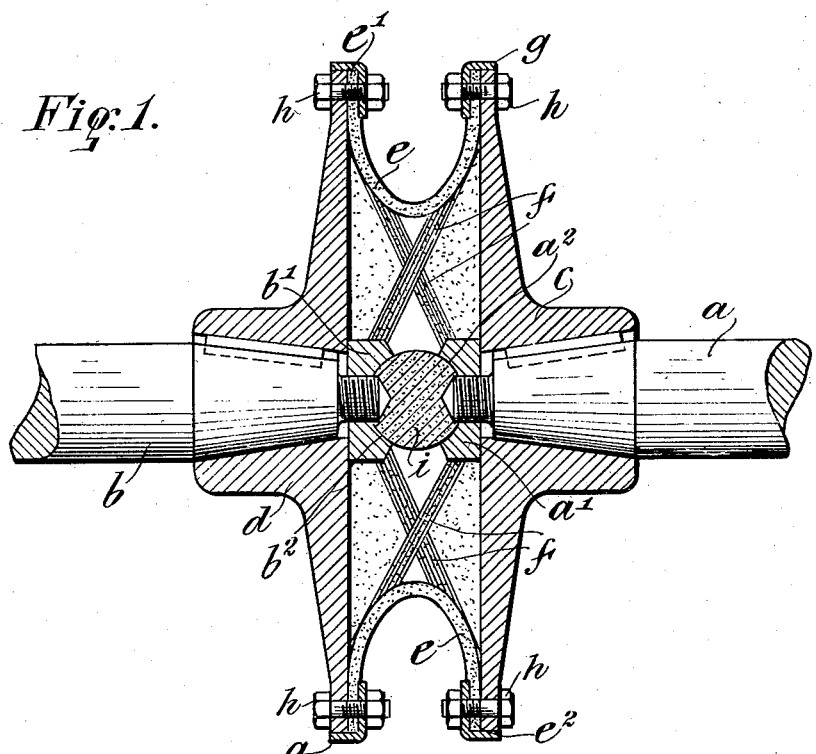
Figure 1 is a view in vertical section through a joint constructed in accordance with the invention.
Figure 2:
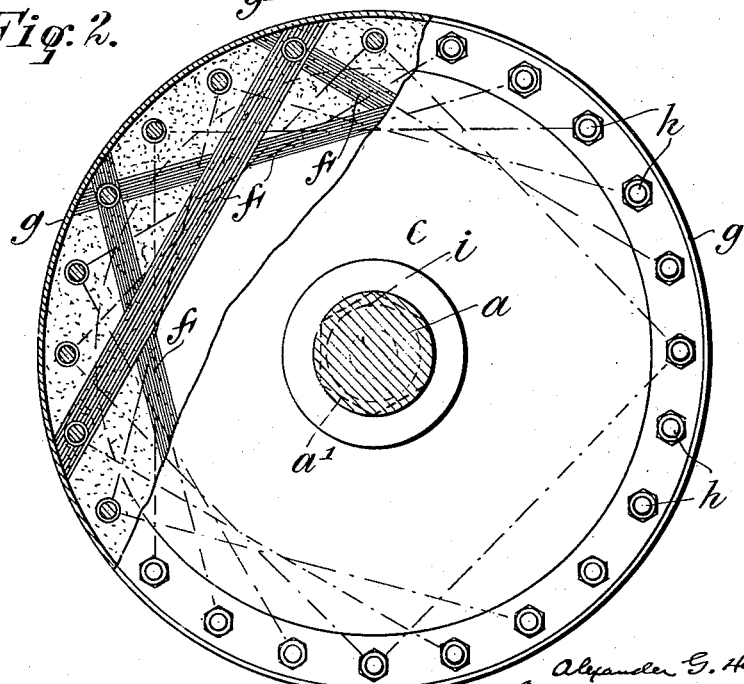
Figure 2 is a view in elevation of one of the plates of the joint, a portion of the transmission element being broken away to show its interior construction.

It may be assumed for the purposes of this description that the shaft $a$ is the drive shaft and is to be connected operatively with the other shaft $b$, which may be termed the driven shaft, with capacity for universal movement between the two shafts. One element of the improved universal joint may comprise a plate $c$, which is of disc form and is keyed to the shaft $a$ and a corresponding element of the improved joint may be formed as a plate $d$, also preferably of disc form and keyed to the other shaft $b$. The problem is to transmit the driving torque from the plate $c$ to the plate $d$ while allowing for universal movement between such plates. In accordance with the invention there is interposed between these plates what will hereafter be termed a transmission element $e$, the structure of which constitutes the principal feature of the invention. This transmission element $e$ is, in cross section, of hyperbolic form and is made up of a series of intersecting flexible straight cords $f$ of any suitable material, each of which cords extend in a straight line from the periphery $e'$ of one side of the transmission element to the periphery $e^2$ of the other side of the transmission element. As shown in Figure 2, when these straight cords are viewed on a section transverse to the transmission element $e$, they will appear as cords of the circle on which the element is laid out. Certain of these cords $f$ extend from one side of the transmission element $e$ to the other in one direction while certain others of the cords extend from the last named side of the transmission element to the first named side in the opposite direction, the result being that such oppositely extending cords intersect adjacent the mid-section of the element and give to it the hyperbolic form shown in Figure 1. As a carrier for these cords they may be imbedded in rubber or other suitable material, so as to form a coupling which may be handled conveniently and assembled and disassembled with the discs $c$, $d$. As a convenient means of attachment of the transmission element $e$ to these discs there are illustrated flanged rings $g$ which engage the opposed faces of the element adjacent the peripheries $e'$, $e^2$ and slide snugly over the peripheries of the plates $c$, $d$. These retaining rings $g$ may be bolted in place by means of bolts $h$.

So far as the improved joint has been described its action can now be understood. When the plate $c$, is rotated in a clockwise direction the driving torque will be transmitted to the plate $d$ through one of the sets of straight cords $f$, this set being the one described as extending from the periphery $e^2$ of the transmission element to the periphery $e'$ thereof. At this time the other straight cords $f$ which are inclined with relation to the first named cords do not serve as transmission elements. If, however, the direction of rotation of the plate $c$ is reversed, then the driving torque is transmitted to the driven plate $d$ through the second named set of cords, the first named set then becoming inactive as transmission elements. In either event, it will be evident that the lines of force of the driving torque coincide with the straight transmission elements $f$, each line of force serving, in effect, to impress a straight pull along each cord $f$. This is a most efficient and advantageous relation since no undue strains through varied angles are imposed on any of the elements of the joint. At the same time the structure is one which permits free angular movement between the shafts $a$, $b$, without any lessening of the efficiency of transmission since the force lines always remain co-incident with the cords $f$ by which the driving torque is transmitted.

Another feature of the invention is concerned with improved devices for holding the plates $c$, $d$ in spaced relationship regardless of their angular movement. In the illustrated embodiment, the shafts $a$, $b$ are shown as having threaded on their proximate ends nuts $a'$, $b'$ which serve as retaining devices for the plates $c$, $d$, respectively, and which have their ends recessed, as at $a^2$, $b^2$, respectively, to provide spherical seats for a generally spherical spacing block $i$. This block $i$ may conveniently be of rubber, so as to yield in one direction or the other along its axis to accommodate changes in angularity between the shafts $a$, $b$, and this without subjecting the block to wear on its surface. The block $i$ may be somewhat under compression, when of resilient material, so as to hold the plates and shafts in spaced relationship, and since it is not subject to wear, there is little likelihood of any looseness in the joint occurring. Of course, the spacer $i$ might be of metal and of spherical form, so as to permit relative movement on its surface between it and the seats $a^2$, $b^2$, and while varying angularity between the shafts and the plates would thus be afforded there would be some degree of wear on the surface of the spacer and this wear would ultimately result in looseness.

The characteristic features of the invention will be set out in the appended claims with such scope as to indicate the permissible modifications embraced within the novel principles on which the invention is based.

We claim as our invention:

1. A universal joint including driving and driven disks, straight flexible non-metallic transmission elements secured fixedly at one end to one of said disks and at the other end to the other of said disks and independent straight flexible non-metallic transmission elements secured fixedly at one end to the first named disk and secured fixedly at the other end to the second named disk, the second named transmission elements extending in the opposite direction of rotation of the disks from the first named transmission elements and crossing the first named transmission elements, respectively, at points between the disks, all of said transmission elements extending along straight lines between the disks to apply the lines of driving force along straight lines.

2. A universal joint including spaced disks, a unitary non-metallic transmission element fixedly secured thereto and formed as a flexible fabricated cylindrical body of hyperbolic form in cross section and having straight cords extending from one side of the cylindrical body to the other and in opposite directions of rotation and crossing, respectively, at points between the disks and extending, respectively, along straight lines.

3. A universal joint including spaced disks, flexible non-metallic transmission cords fixedly secured to the disks and extending in one direction of rotation therebetween, independent flexible cords secured fixedly to the disks and extending in another direction of rotation therebetween, all of said elements extending, respectively, along straight lines, and a unitary carrier of flexible material in which said flexible members are embedded.

4. A universal joint including spaced driving and driven disks, a unitary transmission element formed as a cylindrical body of hyperbolic form in cross section and consisting of non-metallic flexible members extending from one side of the cylindrical body to the other and in opposite directions of rotation, said members crossing each other at points between the disks and extending, respectively, along straight lines, and means to secure the cylindrical body along its periphery to the respective disks along their peripheries.

This specification signed this 22d day of December, A. D. 1919.

ALEXANDER GRISWOLD HERRESHOFF.
AUGUST H. LEIPERT.